United States Patent
Matzelle et al.

(10) Patent No.: US 11,619,029 B2
(45) Date of Patent: Apr. 4, 2023

(54) SYSTEM AND METHOD FOR COUPLED WORK TOOL IDENTIFICATION

(71) Applicant: Caterpillar Inc., Peoria, IL (US)

(72) Inventors: Richard A. Matzelle, Peoria, IL (US); Arjun Veneshetty, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 707 days.

(21) Appl. No.: 16/667,548

(22) Filed: Oct. 29, 2019

(65) Prior Publication Data
US 2021/0123218 A1 Apr. 29, 2021

(51) Int. Cl.
*E02F 9/26* (2006.01)
*H04W 4/30* (2018.01)
*H04W 4/80* (2018.01)
*E02F 3/96* (2006.01)
*A01K 11/00* (2006.01)
*E02F 3/43* (2006.01)
*E02F 9/20* (2006.01)

(52) U.S. Cl.
CPC ............ *E02F 9/264* (2013.01); *A01K 11/004* (2013.01); *E02F 3/435* (2013.01); *E02F 3/96* (2013.01); *E02F 9/2025* (2013.01); *H04W 4/30* (2018.02); *H04W 4/80* (2018.02)

(58) Field of Classification Search
CPC . E02F 3/3609; E02F 3/435; E02F 3/96; E02F 9/2025; E02F 9/205; E02F 9/2054; E02F 9/26; E02F 9/264; H04W 4/30; H04W 4/80; A01K 11/004
See application file for complete search history.

(56) References Cited

U.S. PATENT DOCUMENTS

| | | | | |
|---|---|---|---|---|
| 7,010,386 | B2* | 3/2006 | McDonnell | G05B 19/4065 702/182 |
| 9,354,627 | B2* | 5/2016 | Takemoto | G05B 19/408 |
| 9,467,862 | B2 | 10/2016 | Zeiler et al. | |
| 10,222,782 | B2* | 3/2019 | Oohashi | G05B 19/4065 |
| 10,656,632 | B2* | 5/2020 | Ishigure | G05B 19/4183 |
| 10,872,540 | B2* | 12/2020 | Steketee | E02F 9/2054 |
| 2003/0023325 | A1* | 1/2003 | Adachi | G05B 23/027 700/9 |
| 2003/0182014 | A1* | 9/2003 | McDonnell | G05B 19/4065 700/159 |
| 2011/0040440 | A1* | 2/2011 | de Oliveira | G06Q 10/0631 701/29.5 |
| 2013/0338855 | A1* | 12/2013 | Mason | G07C 5/008 701/2 |
| 2014/0078868 | A1 | 3/2014 | McCaskill, III | |

(Continued)

*Primary Examiner* — Tyler J Lee

(57) ABSTRACT

A work tool identification system for identifying the work tool attachment attached to a machine from among a plurality of interchangeable work tool attachments utilizes a data transmission device located on the work tool attachment and an electronic machine controller that may be located on the machine. The data transmission device may store work tool identification data and may measure an interval count indicative of the lapsed time since the work tool attachment was initially moved by a machine. The electronic machine controller generates and sorts a work tool identification list of the plurality of work tool attachments based on the interval count with the lowest interval count appearing before any higher interval counts that is indicative of a recently coupled work tool.

14 Claims, 5 Drawing Sheets

(56) References Cited

U.S. PATENT DOCUMENTS

| | | | |
|---|---|---|---|
| 2015/0301518 A1* | 10/2015 | Takemoto | G07C 5/02 |
| | | | 701/29.1 |
| 2016/0116906 A1 | 4/2016 | Grivetti | |
| 2017/0372534 A1* | 12/2017 | Steketee | E02F 9/267 |
| 2018/0005461 A1* | 1/2018 | Steketee | G09B 19/167 |
| 2018/0150064 A1* | 5/2018 | Ishigure | G05B 19/408 |
| 2018/0165884 A1* | 6/2018 | Wagner | E02F 9/267 |
| 2019/0112792 A1 | 4/2019 | Reed et al. | |
| 2021/0123217 A1* | 4/2021 | Okumura | G06Q 10/20 |

\* cited by examiner

SYSTEM AND METHOD FOR COUPLED WORK TOOL IDENTIFICATION

TECHNICAL FIELD

This patent disclosure relates generally to machine work tools and, more particularly to a wireless system and method for identifying a connected work tool of a machine.

BACKGROUND

Work machines, such as loaders, excavators, and the like, typically can be used with a number of interchangeable work tools or attachments that may be releasably coupled with the work machine to perform a particular work function. Examples of interchangeable work tools include buckets, blades, forks, grapplers, shears, cutters and the like. The work tools or attachments are usually controlled through an implement control system such as a hydraulic or electrical system associated with the machine to actuate and control implement lift, tilt, rotation, or other maneuvering operations for the implement to perform its function. Because each different work tool typically requires different parameters and control settings, the machine systems may require reconfiguration when a different work tool is interchangeably coupled to the machine.

U.S. Patent Publication 2019/0112792, ("the '792 publication") assigned to the current applicant, describes a system and method to configure a work machine for interacting with interchangeable work tools. The '792 publication in particular discloses a work tool recognition system for assisting the machine and/or the operator of the machine in identifying which particular work tool from among a plurality of available interchangeable work tools the machine is presently coupled with. The system includes a short-range wireless device that can be mounted to the work tool and that can communicate with an onboard electronic controller associated with the work machine. The wireless device and the onboard controller can exchange data and information that the onboard controller can process and analyze to determine the identity of the work tool. The present disclosure is directed to a similar system and method for identifying an interchangeable work tool.

SUMMARY

The disclosure describes, in one aspect, a work tool identification system for identifying the work tool attachment presently coupled to a machine from among a plurality of interchangeable work tool attachments. The system includes a data transmission device mountable to and movable with the work tool attachment. The data transmission device includes a wireless transmitter, a motion detector configured to detect motion of the work tool attachment, a data storage storing work tool identification data associated with the work tool attachment, and a counter configured to measure an interval count since initial movement of the work tool attachment is detected by the motion detector. The system also includes a machine receiver on a machine to receive the work tool identification data and the interval count transmitted from the data transmission device of each of a plurality of work tool attachments. An electronic machine controller on the machine can) generate a work tool identification list indicative of the work tool identification from each of the plurality of work tool attachments and can sort the work tool identification list based on the interval count from each of the plurality of work tool attachments with a lowest interval count appearing before any higher interval count. The system may display the work tool identification list on an operator interface.

In another aspect, the disclosure describes a method for identifying the work tool attachment coupled to a machine from among a plurality of interchangeable work tool attachments. According to the method, an electronic machine controller that may be located on a machine receives a work tool identification data from each of a plurality of work tool attachments and generates a work tool identification list indicative the work tool identification data. The electronica machine controller also receives an interval count from each of the plurality of work tool attachments that is indicative of a time interval since initial movement of a work tool attachment. The electronic machine controller sorts the work tool identification list by the interval counts with the lowest internal count appearing before any higher interval count. The method may conclude by displaying work tool identification list on an operator interface.

In yet another aspect, the disclosure describes a work tool identification system for identifying the work tool attachment presently coupled to a machine from among a plurality of interchangeable work tool attachments. The system includes a machine receiver associated with a machine to receive a work tool identification data and an interval count from each of a plurality of work tool attachments. An electronic machine controller also associated with the machine can generate a work tool identification list indicative of the work tool identification data and can sort the work tool identification list based on the interval count with a lowest interval count appearing before any higher interval count. The system may display the work tool identification list on an operator interface.

BRIEF DESCRIPTION OF THE DRAWING(S)

DETAILED DESCRIPTION

Figure 1:
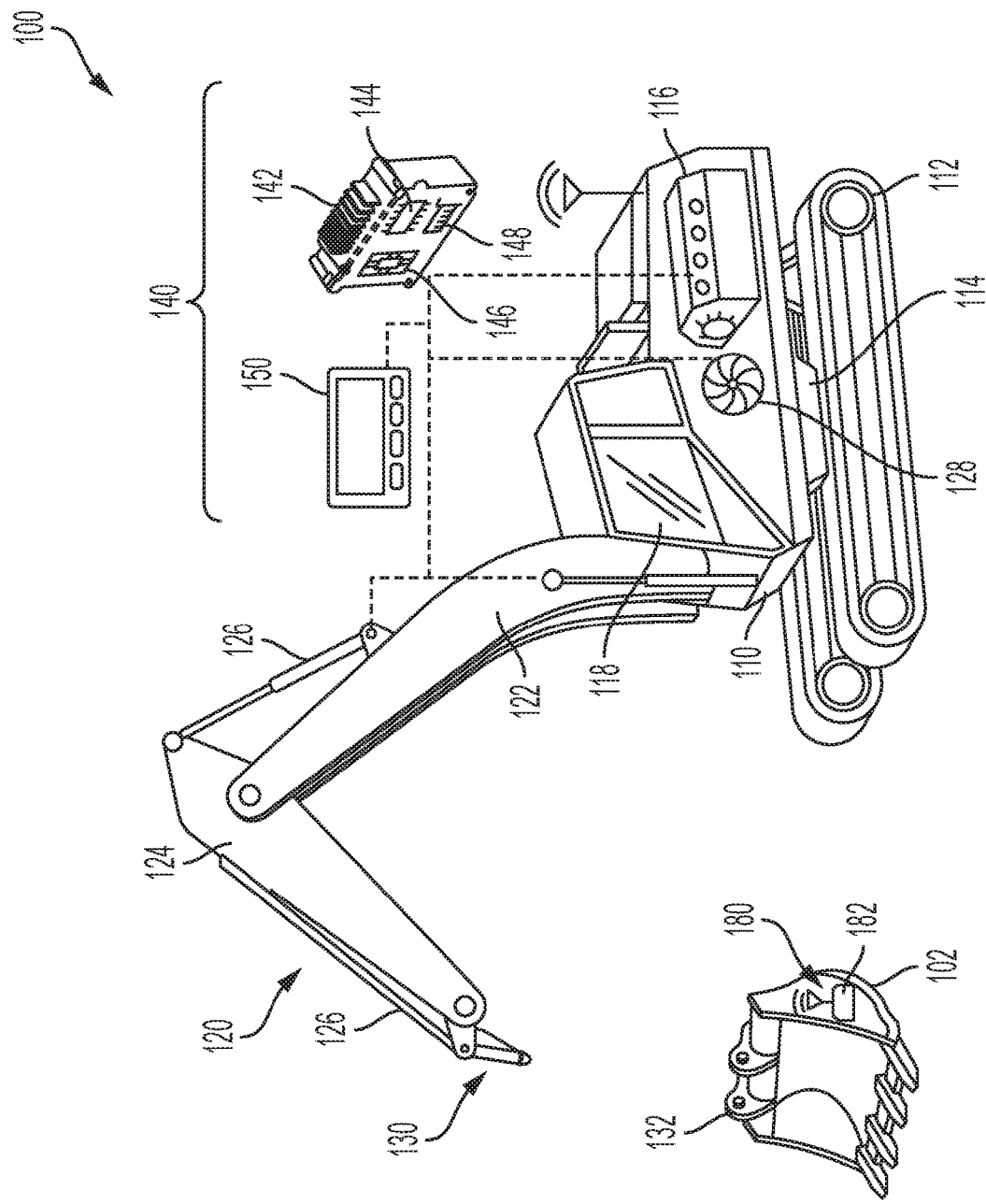
FIG. 1 is a schematic perspective view of a machine and an interchangeable work tool attachment that can be releasably coupled to the machine to perform a particular task.

Reference will now be made in detail to specific embodiments or features, examples of which are illustrated in the accompanying drawings. Wherever possible, corresponding or similar reference numerals will be used throughout the disclosure and accompanying drawings to refer to the same or corresponding parts.

Referring to FIG. 1, there is illustrated an example of a work machine 100 that may be releasably coupled to a work tool attachment 102 for performing a work-related function or task. In the illustrated example, the machine 100 may be in the form of an excavator and the work tool attachment 102 may be a bucket that the excavator can extend and maneuver, for example, to perform digging and material placement operations. However, in other examples, the machine 100 may refer to any type of machine for performing operations associated with an industry such as mining, construction, farming, transportation or other known industry. Examples of machines include wheel loaders, bulldozers, dump trucks, motor graders, material handlers and the like. Such machines may be configured for off-road or on-road operation. In addition to buckets, examples of work tool attachments include blades, compactors, forked lifting devices, brushes, grapplers, cutters, shears, breakers and hammers, and the like which may be used for a variety of tasks including loading, leveling, lifting, compacting, breaking, and material maneuvering.

In the illustrated example of an excavator, the machine includes a frame 110 that may be supported on an undercarriage that includes ground engaging and propulsion devices 112 like continuous tracks or wheels for movement over the surface of a worksite. The frame 110 may include a rotatable platform 114 so that it can rotate with respect to the ground engaging and propulsion devices 112. To power the machine 100, the frame 110 may accommodate a prime mover such as an internal combustion engine 116 and other systems such as gearing and hydraulics for transmitting the power produced by the prime mover. To accommodate an operator, the frame 110 may include an operator cab or operator station 118 situated in an elevated position to provide visibility about the worksite. Situated inside the operator station 118 may be various operator controls and input devices like steering wheels or joysticks to maneuver the machine 100 and to conduct various tasks associated with the machine. To assist the operator in controlling and regulating the machine 100, the operator station 118 may also include various interfaces like dials, switches, readouts, displays and the like. However, in other embodiments, the machine 100 may be configured for autonomous, semi-autonomous, or remote operation. In autonomous operation, the machine 100 may utilize various sensors and controls to conduct operations without human interaction. In semi-autonomous operation, a human operator may conduct some of the tasks and assume some control over the machine, while the machine itself may be responsible for other operations. In remote configurations, the operator may be located away from the machine and control it indirectly through remote controls.

To connect with and maneuver the work tool attachment 102, the machine 100 can include an implement mechanism 120 which may be operatively supported by the frame 110. In the illustrated example of an excavator, the implement mechanism 120 can include a mechanical linkage with connected and elongated rigid bodies or links that can pivot and articulate with respect to each other to extend, retract, lift, lower and/or tilt the work tool attachment 102. In the example of an excavator, the links may include a boom 122 that is pivotally connected at one end to the frame 110 and pivotally connected at the other end to a stick 124 or dipper. Pivotally disposed at the end of the stick 124 can be the work tool attachment 102 in the form of a bucket. To cause the boom 122, stick 124 and bucket 102 to articulate with respect to each other, the work implement may be operatively associated with one or more actuators 126 such as, for example, hydraulic cylinders that can extend and retract a piston resulting in lifting, tilting and other motions. To pressurize and direct hydraulic fluid for use by the actuator 126, the machine 100 can include a hydraulic system 128 that is operatively coupled to the internal combustion engine 116. It will be appreciated, however, that other configurations of the implement mechanism 120 such as those used by dozers, wheel loaders, and other types of machines are contemplated by the disclosure. In addition, other embodiments of actuators may be used such as electric motors and other electromagnetic devices.

To enable the machine 100 to perform a variety of tasks, or to customize the machine for a particular task, the work tool attachment 102 may be interchangeable and may be configured for releasable attachment to the implement mechanism 120. Releasable attachment of the work tool attachment 102 may be achieved by a coupling mechanism or machine coupler 130 disposed at the distal end of the implement mechanism 120. The machine coupler 130 can have any suitable configuration and structure for interlocking with a corresponding attachment point, or tool coupler 132, on the work tool attachment 102. Examples include removable pin couplers in which pins can be inserted through apertures disposed in appropriate structures on the work tool attachment 102 and implement mechanism 120, knuckle couplers or jannery couplers utilizing interconnecting claws, or any other conceivable type of coupling. In various embodiment, the machine coupler 130 and tool coupler 132 can form a pivotal joint so that the work tool attachment 102 can move with respect to the implement mechanism 120. In an embodiments, the machine and tool couplers 130, 132 can be quick couplers configured for rapid attachment and detachment with the work tool attachment with limited or reduced operator involvement. The quick couplers may be configured with coupler sensors to confirm if a work tool attachment is coupled to the machine. In some embodiments, engagement and disengagement of the machine and tool couplers 130, 132 can be actuated by or with assistance of the hydraulic system 128 associated with the machine 100.

Figure 2:
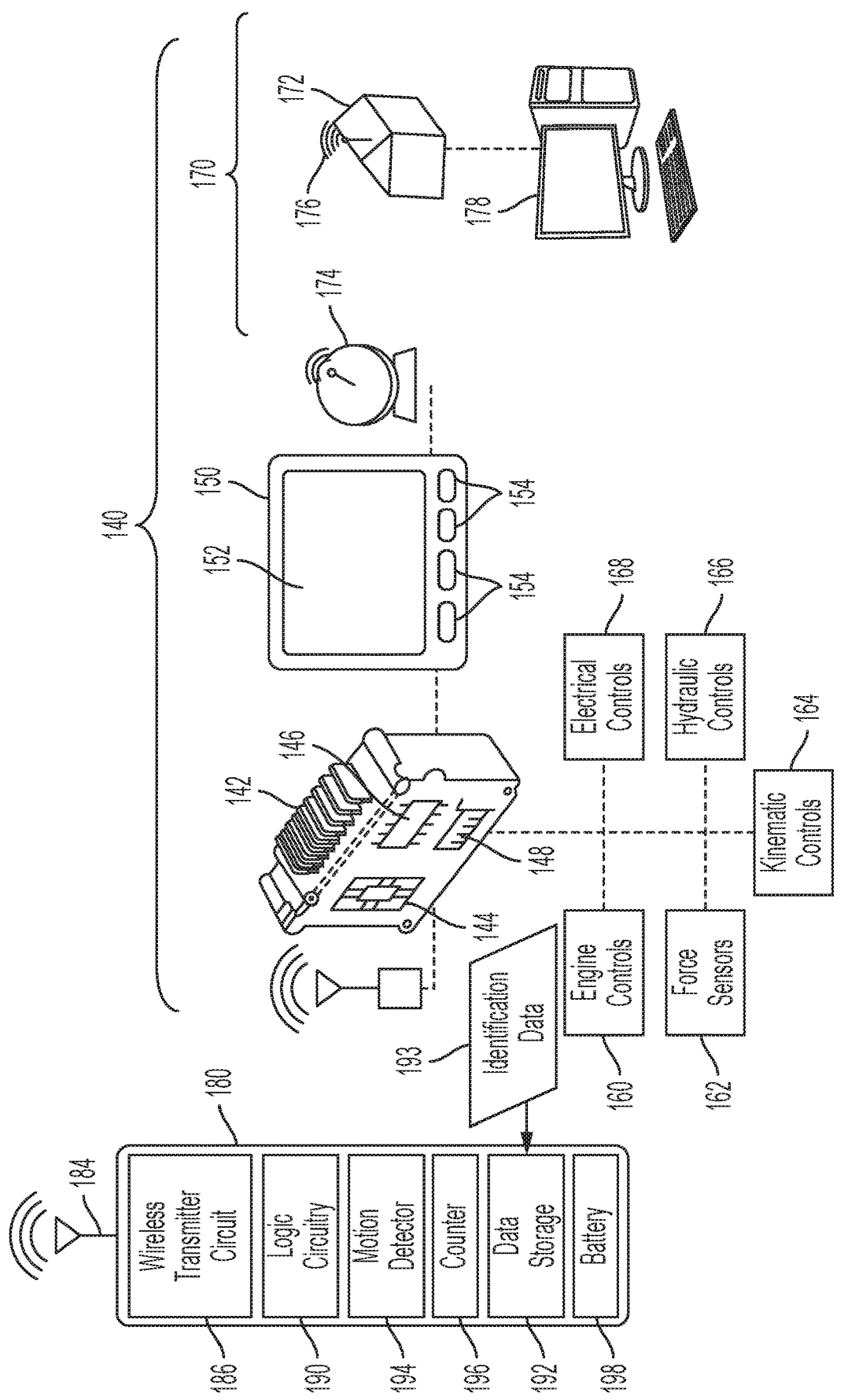
FIG. 2 is a schematic block diagram of a work tool identification system including a data transmission device that can be mounted to the work tool attachment and that can communicate with an electronic machine controller that may be located on the machine.

Referring to FIGS. 1 and 2, to recognize or identify the interchangeable work tool attachment 102 that is presently coupled to the machine 100, which may assist in setting or calibrating operating parameters of the machine for a particular work tool attachment, the machine 100 can be associated with a work tool identification system 140. The work tool identification system 140 may be a system or utility level software program that may be implemented by or executed by an electronic control unit, control module or electronic machine controller 142 configured to process electronic signals in the form of binary bits and bytes. Although the illustrated electronic machine controller 142 is illustrated as a single discrete unit, the work tool identification system 140 and its functionality may be distributed among a plurality of distinct and separate components. Moreover, although the electronic machine controller 142 is associated with the machine 100, some associated components and functionality of the work tool identification system 140 may be located off board of the machine 100. However, the electronic machine controller 142 is adapted for monitoring various operating parameters and to responsively regulate various variables and functions affecting operation of the machine 100 and thus, in an embodiment, may be onboard the machine 100. To process electronic data signals and execute instructions, the electronic machine controller 142 can include appropriate circuitry 144 like one or more microprocessors, application specific integrated circuits ("ASIC"), field programmable arrays, and the like. The electronic machine controller 142 can be configured to execute various functions, steps, routines, data maps, data tables, charts and the like. In possible embodiments, the electronic machine controller 142 can be responsible for regulating and controlling other operational aspects and functions of the machine 100.

To store the functions, routines, algorithms, data maps, data tables, data charts, and the like, and to store computer executable software code providing programming instructions for execution of programs and applications and for interpretation and manipulation of data, the electronic machine controller 142 can be operatively associated with data storage 146. The data storage 146 can be in the form of memory, such as random access memory or read only memory, or can be a more permanent storage device such as a hard drive. The data storage 146 can be repetitively read from and written to, and provides for storage of data and information utilized by the controller 142 for executing the functions and tasks of the machine 100.

To receive operational data and to send control commands, the electronic machine controller 142 can include a data input/output interface 148 that can communicate with various sensors and controls disposed about the machine 100 and that are operatively associated with the work tool identification system 140. Communication between the electronic machine controller 142 and the other components associated with the work tool identification system 140 can be established by sending and receiving digital or analog signals across communication channels such as communication lines or communication busses. For example, as will be familiar to those of skill in the art, a controller area network ("CAN") can be utilized that is a standardized communication bus including physical communication channels conducting signals conveying information between the electronic machine controller 142 and the sensors and actuators disposed about the machine 100. However, in other embodiments, the work tool identification system 140 may utilize other or additional forms of data communication such as radio frequency waves like Wi-Fi, optical wave guides and fiber optics, or other technologies. The various communication channels are indicated in dashed lines for illustration purposes.

To interact with an operator, the work tool identification system 140 may be operatively associated with an operator interface 150, also referred to as a human-machine interface ("HMI"). The operator interface 150 can be an output device to visually or otherwise present information to and receive instructions from a human operator regarding operation and regulation of the machine 100 by the electronic machine controller 142. The operator interface 150 can be a liquid crystal display ("LCD") capable of presenting numerical values, text descriptors, graphs, charts and the like regarding operation. In other embodiments, other visual displays may be used such as a cathode ray tube. The operator interface 150 may include or have the capabilities of a touchscreen 152 to receive input from a human operator to direct instructions or requests to the electronic machine controller 142. In particular, touchscreens 152 may present textual or visual information as images or text that the operator may touch to select some desired input. The operator interface 150 may also include tactile inputs 154 like buttons, switches, keypads and the like for interacting with the operator. In other embodiments, other interface devices may be included such as dials, knobs, keyboards, mice, printers, etc. with the work tool identification system 140. Other types of visual and/or audible alarms may also be included with the operator interface 150. As explained more fully below, the electronic machine controller 142 may be in electronic communication with a machine transmitter/receiver 158 such as a radio frequency antenna for establishing radio frequency communications with other devices.

Referring to FIG. 2, to gather data regarding operation of the machine 100 and to control or regulate operation of the machine systems, the electronic machine controller 142 can be operatively associated with one or more sensors and/or controls disposed about the machine 100. For example, the electronic machine controller 142 can communicate with one or more engine controls 160 or actuators associated with the prime mover such as the internal combustion engine. As will be familiar to those of skill in the art, the electronic machine controller 142 can regulate engine operating parameters like idle speed, air-fuel ratios, variable valve timing and the like. The electronic machine controller 142 may also be associated with one or more force sensors 162 (e.g., strain gauges, piezoelectric devices, potentiometers, fluid pressure sensors, etc.) configured to measure forces or torque applied to the implement mechanism 120, the actuators 126, and the work tool 102. To regulate operation of the implement mechanism 120, the electronic machine controller 142 can be associated with kinematic controls 164 that may be used to control or limit movements of the implement mechanism when performing various tasks. Similarly, to regulate operation of the hydraulic system and/or electrical system that may be responsible for movements and operations of the implement mechanism 120 and/or machine 100, the electronic machine controller 142 can be associated with hydraulic controls 166 and electrical controls 168.

In an embodiment, the work tool identification system 140 can be operatively associated with a telematics system 170 to communicate with an external or remote location 172 to send and receive operational and/or status information. Telematics communication can be established by wireless protocols such as WiFi or cellular communications between a transmitter/receiver 174 located on the machine 100 and a transmitter/receiver located at the remote location 172. The remote location 172 may be associated with a remote computer system 178 that can provide additional processing capabilities for operation of the machine. In various embodiments, the remote computer system 178 can be used for remote or semi-autonomous operation of the machine.

With reference to FIGS. 1 and 2 and in accordance with an aspect of the disclosure, to assist the work tool identification system 140 in identifying the work tool attachment 102 to which the machine 100 may be coupled with, a data transmission device 180 may be associated with the work tool attachment 102. In an embodiment, the data transmission device 180 may be physically installed and located on the interchangeable work tool attachment 102 so that it will remain associated with the work tool attachment as it is changed and relocated between various machines 100. As illustrated in FIG. 1, the data transmission device 180 can be configured as a compact structure the components of which may be disposed in a plastic housing 182 that can mounted to a suitable location on the work tool attachment 102 to avoid damage or interference with operation of the work tool attachment. Mounting of the data transmission device 180 can be achieved by fasteners such as bolts, adhesives, welding, or other suitable mounting techniques.

Referring to FIG. 2, to wirelessly transmit and/or receive data signals in the form of radio waves, the data transmission device 180 can include a transmitter 184 such as a radio wave antenna and associated wireless transmission circuitry 186 that can embody functionality and protocols to encode data signals as radio waves for wireless transmission via a network such as, for example, a cellular network, a WiFi network, or other suitable wireless communications network. In an embodiment, the transmitter 184 and the wireless transmission circuitry 186 may be configured to transmit shortwave radio signals that may be broadcasted about a 100 meters or less. In such an embodiment, the wireless transmission circuitry 186 may be a Bluetooth circuit. In other embodiments, data communication with the data transmission device 180 can be achieved by other technologies such as, for example, infra-red signaling or electromagnetic induction. In addition to wireless data communication, aspects of the disclosure may applicable to embodiments wherein the data transmission device 180 can transmit data over physical communication channels like cables, jacks, male and female connectors, etc.

The data transmission device 180 may include additional components for functionality. For example, the data transmission device 180 can also include logic circuitry 190 that may be a microprocessor or similar integrated circuit having logic functions to control operation of the device. To store information in the form of data about the work tool attachment 102 or about the data transmission device 180, a data storage 192 can be included as part of the device that can be electronically accessed by the logic circuitry 190. The data storage 192 can be in the form of computer readable and/or writable memory. The data storage 192 may include identifying information and data about the work tool attachment 102 and/or about the data transmission device 180. In an embodiment, the work tool identification data 193 can include information such as type or make of the work tool attachment, serial number, date of manufacture and the manufacturer, and the like. Additional data may include operating parameters for the work tool attachment, settings, limitations for the work tool attachment, service data like the date of servicing of the work tool attachment, and the like. The work tool identification data 193 can be input at the time the data transmission device 180 is mounted to the work tool attachment, for example, by directly or indirectly connecting the data transmission device 180 to an external programming device like a computer and which may be updated periodically. In another embodiment, the work tool identification data 193 can be a serial number associated with the data transmission device 180 that is initially independent of the work tool attachment. Once attached, the work tool identification system 140 and other backend computer systems can be programmed to associate the serial number of the data transmission device 180 with the work tool attachment 102. Once associated, the serial number serves as an indirect identification reference for the work tool attachment 102 and can be used to access other information regarding it.

In addition, to sense movement of the work tool attachment 102, for example, when it is coupled to and picked up by the machine, the data transmission device 180 can include a motion detector 194 such as an accelerometer that can measure acceleration forces. Any change in the current state or spatial reference experienced by the work tool attachment 102 is interpreted by the accelerometer as movement. Other examples of motion detectors 194 include a gyroscope and a barometer. The motion detector 194 can be operatively associated with a timer or counter 196 for measuring time intervals between two trigging events. The counter 196 can measure time in units such as seconds and minutes, or may measure time in random identical intervals. To provide power for the data transmission device 180, a battery 198 or similar power cell can be included that may or may not be rechargeable. The data transmission device 180 may actively or passively transmit data with other devices.

The disclosed work tool identification system 140 can utilize the data transmission device 180 to identify or determine which work tool attachment 102, among a possible plurality of interchangeable work tool attachments, the associated machine 100 is coupled with. For example, referring to FIG. 3 and as described in the '792 application, a plurality of machines 100, 200, 202, 204, 206, may be operating at a common worksite in close proximity to a plurality of work tool attachments 102, 210, 212, 214, 216. A portion of the plurality of work tool attachments 102, 210, 212, 214, 216, 218, 220 may be disposed about the worksite in a detached state and available for coupling with one of the respective machines. Others of the plurality of work tool attachment may already be coupled to a respective machine and unavailable. Each work tool attachment 102, 210, 212, 214, 216 may have mounted thereon a data transmission device 180 similar to that described above and each data transmission device may periodically or continuously broadcast, by wireless transmission, identifying information about itself or the work tool to which it is attached. Each machine 100, 200, 202, 204, 206, may be equipped with a machine receiver 158 as described above that may be periodically or continuously monitoring for shortwave data broadcasts such that the plurality of machines and the plurality of work tools may be simultaneously communicating with each other. Thus, each machine may receive the work tool identification data 193 from a plurality of potential work tool attachments to which the machine may be coupled. Because of the close proximities involved, relative signal strengths may be insufficient to determine which machine is operatively coupled to a particular one of the interchangeable work tools attachments. As described below, the work tool identification system 140 can sort the plurality of work tool attachments to assist an operator in identifying the attached work tool attachment.

INDUSTRIAL APPLICABILITY

Figure 4:
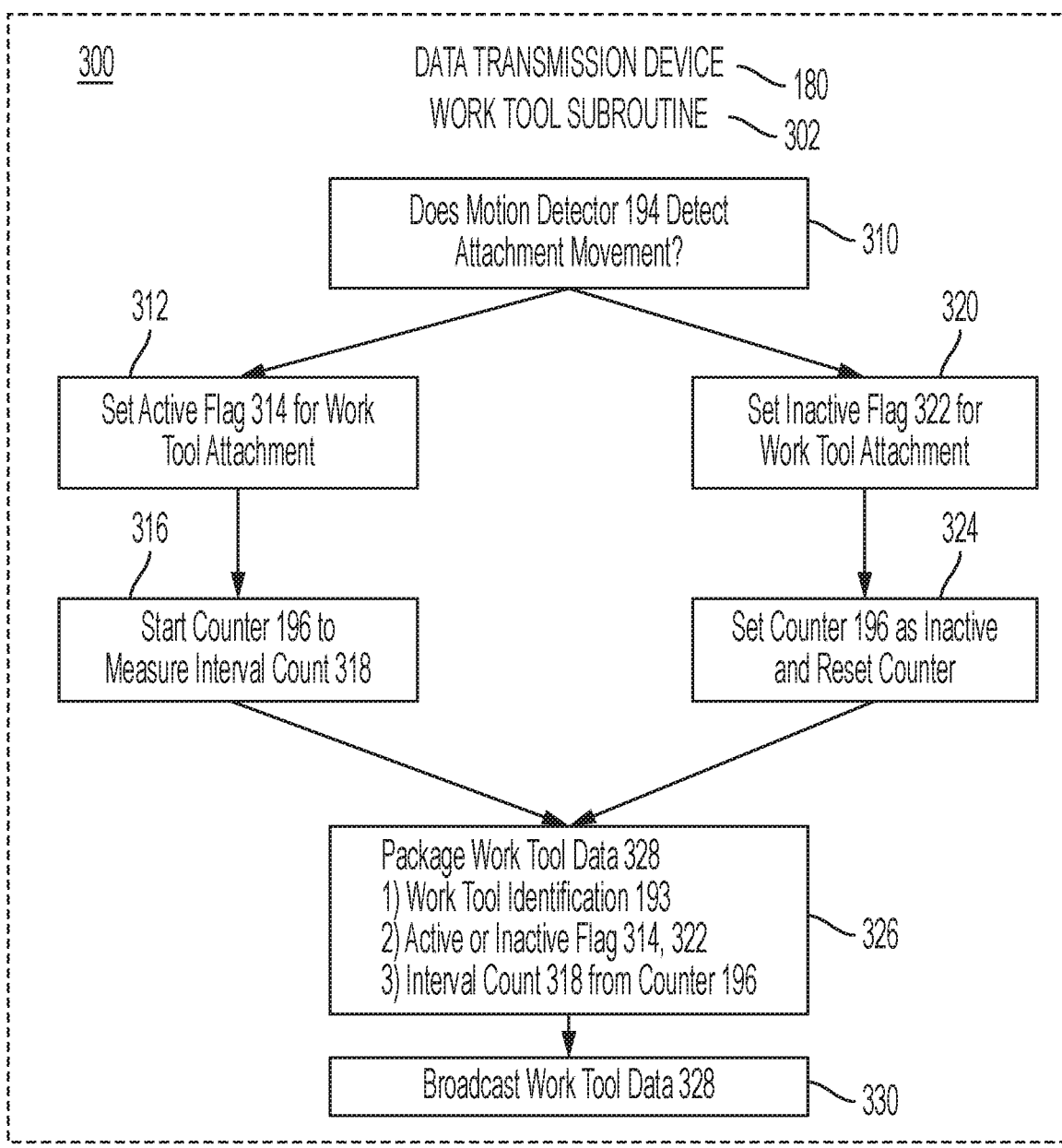
FIG. 4 is a flow diagram illustrating a possible routine, process, and/or algorithm for the work tool identification system as may be implemented from the perspective of the data transmission device disposed on the work tool attachment.
Figure 5:
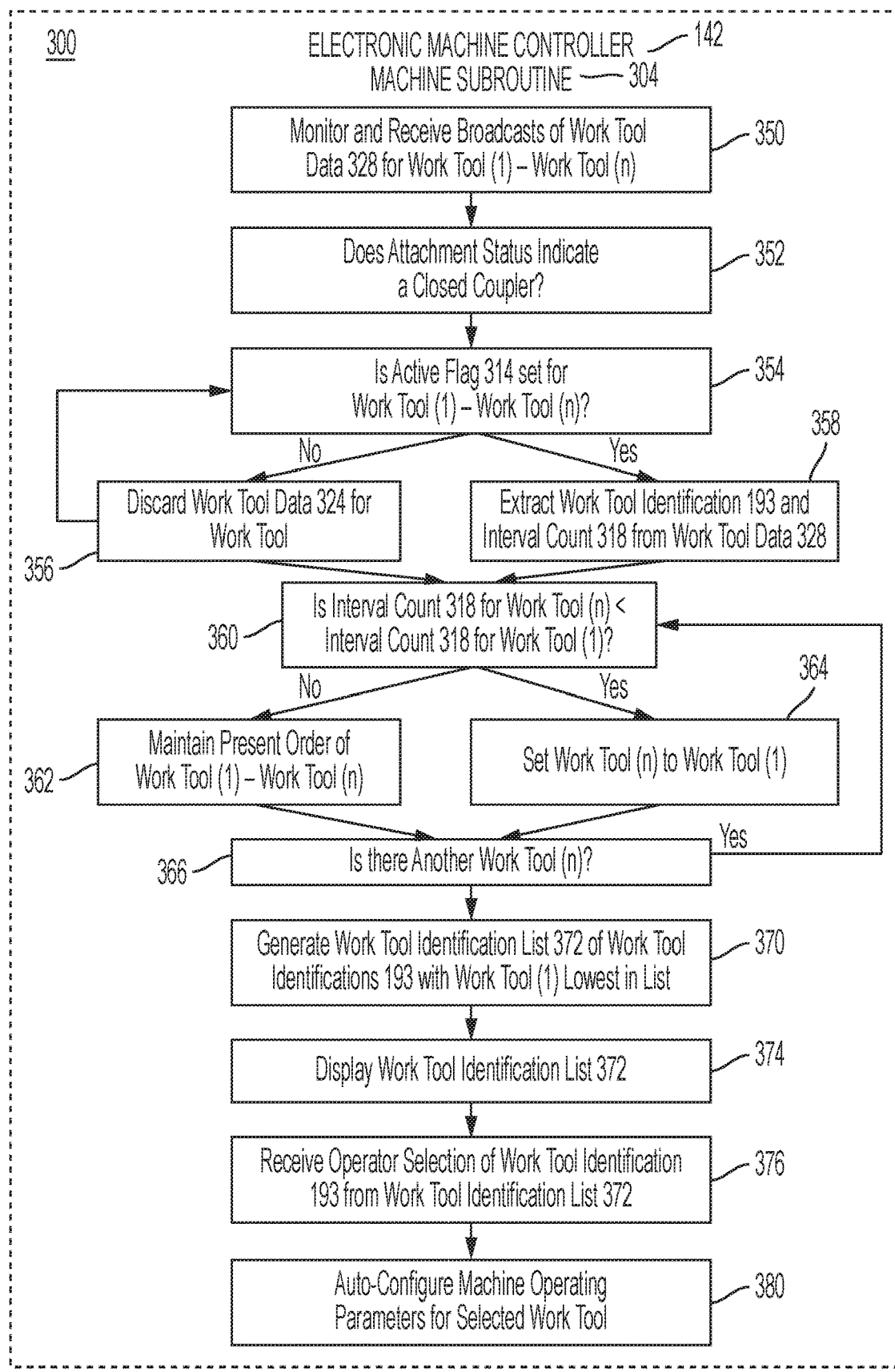
FIG. 5 is a flow diagram illustrating a possible routine, process, and/or algorithm for the work tool identification system as may be implemented from the perspective of the electronic machine controller onboard the machine.

The present disclosure may be applicable to any machine or group of machines that are capable of releasably coupling with and utilizing a plurality of interchangeable work tool attachments. In accordance with an aspect of the disclosure, the work tool identification system 140 utilizes information provided by the data transmission device 180, including the work tool identification data 193 described above, to assist an operator, located either onboard or remotely, to identify the coupled work tool attachment 102 from a plurality of possible work tool attachments through a process of sorting and elimination. The work tool identification system 140 operates by continuously broadcasting data from the data transmission device 180 associated with the plurality of work tool attachments 102 about the worksite to the plurality of machines 100. The work tool identification system 140 generates a rolling list of the plurality of work tool attachments 102 that is sorted to identify the work tool attachment most likely coupled to the machine 100. The work tool identification system 140 may be operated in a manner such that the list of work tool attachment is continuously or periodically updated to reflect current activity status. Referring to FIGS. 4-5, there is illustrated an embodiment of a computer-implemented process, application, or algorithm 300 that may be conducted by the work tool identification system 140. While the algorithm 300 is disclosed as a series of steps and blocks, it will be appreciated that variations, rearrangements, deletions, and additions are contemplated by the disclosure. The algorithm 300 may be separated into subroutines or constituent algorithms depending upon whether their functionality is implemented or executed by the data transmission device 180 or by the electronic machine controller 142.

Illustrated in FIG. 4 is a work tool subroutine 302 representing the portions of the algorithm 300 executed or conducted by the data transmission device 180 mounted to the work tool attachment 102. The work tool subroutine 302 includes the collection and preparation of data by the data transmission device 180 for broadcast transmission to the plurality of machines 100. Broadcast transmissions may indiscriminately broadcast the same data signal to many different devices. Each data transmission device 180 mounted to a work tool attachment 102 at the worksite may be programmed to execute the work tool subroutine 302. To first determine if the respective work tool attachment 102 is coupled to any machine 100, the work tool subroutine 302 determines, in an initial motion detection step 310, whether the work tool attachment 102 is in motion as may occur when the work tool attachment is initially coupled to and lifted by the machine 100. To detect motion during the motion detection step 310, the motion detector 194 on the data transmission device 180 may sense or respond to application of acceleration forces causing a change in the spatial reference of the work tool attachment 102. The data transmission device 180 may therefore determine the work tool attachment 102 to which it is mounted is "active" and being used by a machine 100 rather than "inactive" or decoupled relative to the machine. To reflect the active state, the work tool subroutine 302 in a flag setting step 312 can set an active flag 314, which may be a data field in the data transmitted by the data transmission device 180.

In addition, the work tool subroutine 302 in a start counter step 316 starts or initiates the counter 196 associated with the motion detector 194 as triggered by initial movement of the work tool attachment, which can remain active so long as the motion detector 194 continues to sense motion of the work tool attachment 102. As part of the start counter step 316, the counter 196 measures an interval count 318 representing the duration of time since the initial movement, i.e., coupling, of the work tool attachment 102. The interval count 318 therefore represents the lapsed units of time since the initial coupling of the work tool attachment 102 to a machine 100. The counter 196 may measure time in any suitable units including minutes, seconds, or unstandardized units that may be common among the plurality of data transmission devices 180. In an embodiment, the counter 196 may be set with a maximum increment limitation to indicate the work tool attachment is secured to the machine and avoid possible reset errors.

Alternatively, if the motion detector 194 does not detect motion, indicating the work tool attachment 102 is stationary and likely in an uncoupled state, the work tool subroutine 302 may in another flag setting step 320, set an inactive flag 322 that may be another data field in the data to be transmitted. In a subsequent count reset step 324, the counter 196 may be inactivated and the counter may be reset to clear itself of any previously stored count intervals. In various embodiments, the work tool subroutine 302 may include dwell time or delay periods for determining, in the motion detection step 310, whether the work tool attachment 102 is experiencing relatively continuous motion and is thus in active use, or whether the work tool attachment has become inactive and is likely detached from the machine 100. For example, if the motion detector 194 does not sense or register movement or vibration of the work tool attachment 102 for a predetermine period of time, the work tool subroutine 302 may conclude the work tool attachment is no longer active and proceed to the flag setting step 320 to set the inactive flag 322.

In a data preparation step 326, the work tool subroutine 302 prepares or packages the obtained work tool data 328 for broadcast transmission to the plurality of machines 100. The work tool data 328 includes the work tool identification data 193 stored in data storage 192, the active flag 314 or inactive flag 322, and the interval count 318 obtained from the counter 196. In the example where the inactive flag 322 has been set, the interval count 318 may be zero or may otherwise represent the absence of lapsed time with respect to movement of the work tool attachment 102. The data transmission device 180 in a broadcast transmission step 330 thereafter transmits or broadcasts the work tool data 328 broadly to the plurality of machine 100 that may be within broadcast range of the transmitter 184.

Figure 3:
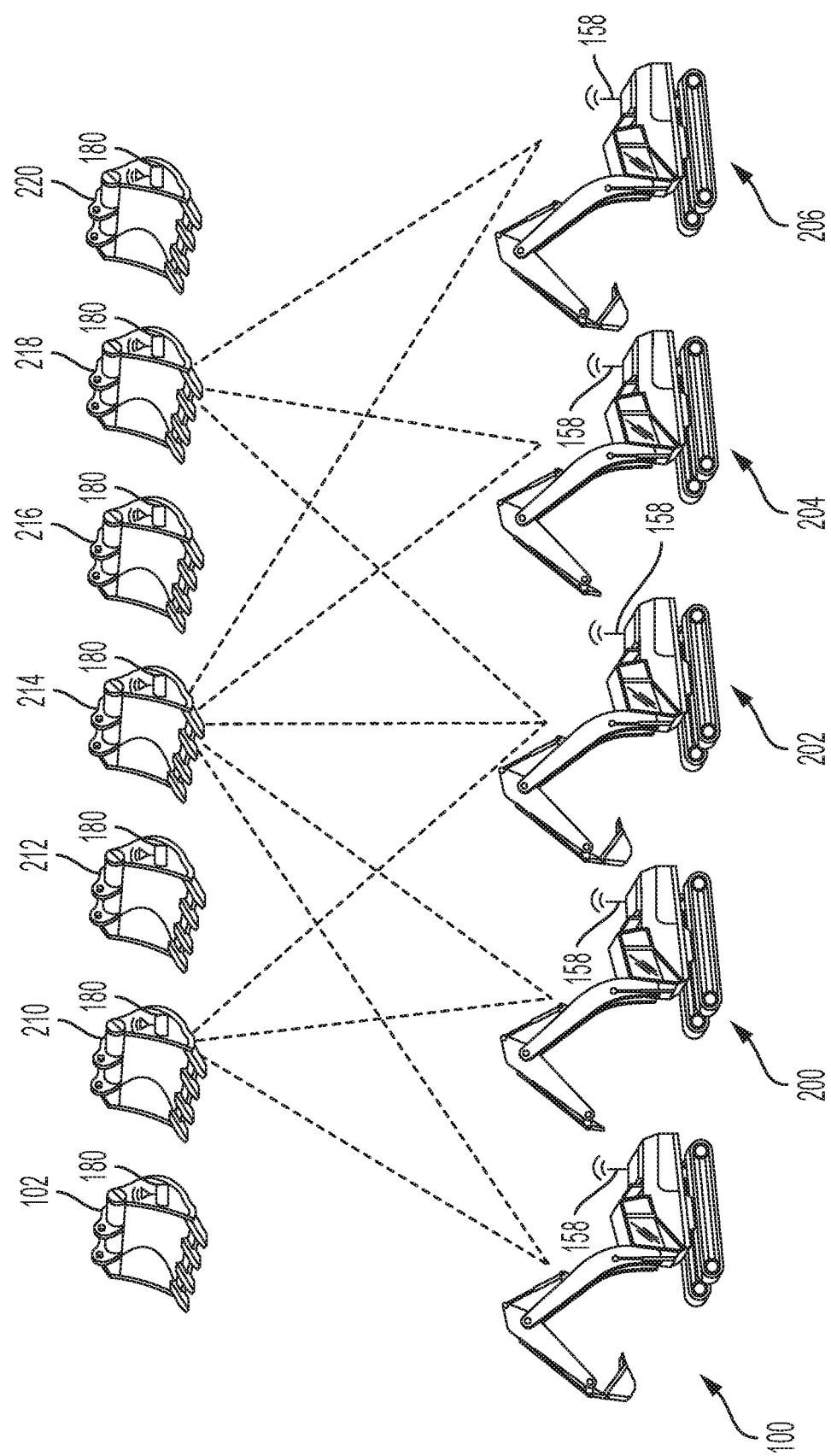
FIG. 3 is a diagrammatic view of a plurality of machines and a plurality of work tool attachments that can be interchangeably coupled with each other that illustrates data communication between the machines and work tool attachments in accordance with the disclosure.

Illustrated in FIG. 5 is a machine subroutine 304 representing the portions of the algorithm 300 executed or conducted by the electronic machine controller 142 that may be located on the machine 100. In a monitoring step 350, the machine subroutine 304 using the machine receiver 158 may continuously monitor and receive broadcast transmissions of work tool data 328 from a plurality of data transmission devices 180 associated with the plurality of work tool attachments 102 at the worksite. This may include work tool data 328 from work tool attachment (1) to work tool attachment (n) if such work tool attachments 102 are sufficiently near in proximity to the machine receiver 158. In embodiments where the machine coupler 130 and the tool coupler 132 are quick couplers, the machine subroutine 304 can execute a coupler determination step 352 to determine if further assessment of the work tool data 328 from the plurality of work tool attachments 102 is necessary. In an embodiment, the machine couplers 130 may be operatively associated with a coupler sensor that can signal an attachment status to electronic machine controller 142 indicative of whether the machine coupler is closed or opened. Coupler determination step 352 determines if the machine coupler 130 is closed, indicating an unidentified work tool attachment 102 is coupled to the machine 100, before proceeding with the machine subroutine 304. If the coupler determination step 352 indicates the machine coupler 130 is open, the machine subroutine 304 may return to the monitoring step 350 to continue monitoring and receiving work tool data 328 without further processing and analysis. Referring to FIG. 3, such would be the status of machines 200, 202 that do not have an attached work tool attachment 102 and do not need to identify any particular work tool attachment.

If the coupler determination step 352 is positive, the machine subroutine 304 in an active flag analysis step 354 can analyze the work tool data 328 from work tool attachment (1)-work tool attachment (n) for active flags 314 or inactive flags 322. If the inactive flag 322 is set, or if the active flag 314 is not set, for an analyzed work tool attachment, the active flag analysis step 354 may proceed to a discard data step 356 and discard the work tool data 328 for that work tool attachment and continue to analyze work tool data 328 for other work tool attachments 102. Referring to FIG. 3, work tool attachments 102, 212, 216, 220 may represent the status of inactive flags 322 indicating they are presently not coupled to a machine 100 and may be eliminated from further analysis. If the active flag 314 is set for an analyzed work tool attachment, the active flag analysis step 354 proceeds to a data extraction step 358 and extracts from the work tool data 328 the work tool identification data 193 and the interval count 318 for that work tool attachment 102.

To determine the most recently coupled work tool attachment 102, the machine subroutine 304 can sort the remaining work tool attachments (1)-work tool attachments (n) having active flags 314 by their interval count 318, which signifies the lapsed time since the work tool attachment 102 was initially coupled to and moved by a machine 100. In an embodiment, a sort algorithm can arrange work tool attachment (1)-work tool attachment (n) so the work tool attachment with the lowest interval count 318 appears first in the sort order. To execute the sort algorithm, in an interval count comparison step 360, the interval count 318 for work tool attachment (1) is compared to the interval count 318 for work tool attachment (n). The initial ordering of work tool attachment (1)-work tool attachment (n) is unimportant and may be randomly established. If the interval count 318 for work tool attachment (1) is lower, the machine subroutine 304 in an order maintenance step 362 maintains the present sort order of work tool attachment (1) with respect to work tool attachment (n). If the interval count 318 for work tool attachment (1) is higher, the machine subroutine 304 in an order switch step 364 may switch the sort order of work tool attachment (1) and work tool attachment (n). In a subsequent query step 366, the machine subroutine 304 may query if there are other work tool attachments 102 having interval counts 318 for comparison and, if so, may repeat the sort algorithm until the lowest to highest sort order of interval counts 318 has been established for work tool attachment (1) to work tool attachment (n).

In a subsequent list generation step 370, the machine subroutine 304 can thereafter generate a work tool identification list 372 with the work tool attachment 102 having the lowest interval count 318 appearing before any work tool attachment having a higher interval count. In accordance with the disclosure, the lowest interval count 318 will indicate or signify the most recently coupled work tool attachment 102 from the plurality of work tool attachments. In other words, work tool attachments 102 having higher interval counts 318 will likely have been coupled to a machine 100 and in near continuous motion, and thus have been in use longer. If the work tool identification system 104 is executed at the time the machine 100 is initially coupled to a work tool attachment 102, that work tool attachment will have the lowest count interval 318 among the plurality of available work tools and can be readily identified. The generated work tool identification list 372 can identify individual work tool attachments 102 by their unique work tool identification data 193. The work tool identification list 372 may include the identification data 193 for all active work tool attachments (1) to work tool attachments (n), but the most recently moved, and therefore most recently attached, work tool attachment appears first in the list. In an embodiment, the work tool identification list 372 can be regenerated on a rolling or continuous basis so that work tool attachments can be iteratively added and removed as they are attached and detached from machines. In particular, because work tool data 328 is continuously and automatically broadcast transmitted from the plurality of work tool attachments to the plurality of machines, each machine 100 may generate the list on a rolling basis to continuously update the work tool data 328 with particular work tool attachments added or removed from the list depending on their activity status, proximity, etc.

After generation, in a display step 374, the work tool identification list 372 can be displayed to the operator, for example, on the operator interface 150. In a further embodiment, in subsequent selection step 376, the operator may select the appropriate work tool attachment 102 from the generated work tool identification list 372. The selection step 376 provides the operator the opportunity to verify the correct work tool attachment 102 is attached. In another embodiment, in parameter configuration step 380, the electronic machine controller 142 can auto-configure the kinematic, hydraulic, and/or electrical parameters of the machine 100 for the coupled work tool attachment 102, either as determined by the lowest interval count 318 or as selected by the operator. In embodiments where the machine 100 operates autonomously or remotely, auto-configuration of kinematic, hydraulic and/or electrical parameters may occur automatically by selecting those parameters for the work tool attachment having the lowest interval count, and thus the most likely one to be attached to the machine.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:
1. A work tool identification system comprising:
   a data transmission device mountable to a work tool attachment, the data transmission device including a wireless transmitter, a motion detector configured to detect motion of the work tool attachment, a data storage storing work tool identification data associated with the work tool attachment, and a counter configured to measure an interval count since initial movement of the work tool attachment is detected by the motion detector;

a machine receiver associated with a machine and configured to receive the work tool identification data and the interval count from the data transmission device of each of a plurality of work tool attachments;

an electronic machine controller associated with the machine, the electronic machine controller configured to (i) generate a work tool identification list indicative of the work tool identification from each of the plurality of work tool attachments and (ii) sort the work tool identification list based on the interval count from each of the plurality of work tool attachments with a lowest interval count appearing before any higher interval count;

an operator interface configured to display the work tool identification list to an operator; and a machine coupler configured to send a coupler attachment status indicative of an open coupler and a closed coupler, and the electronic machine controller is further configured to generate the work tool identification list if the coupler attachment status indicates a closed coupler.

2. The work tool identification system of claim 1, wherein the electronic machine controller is further configured to detect an operator selection from the work tool identification list indicative of a work tool attachment selected from among the plurality of work tool attachments.

3. The work tool identification system of claim 2, wherein the electronic machine controller is further configured to auto-configure one or more machine operating parameters in accordance with the work tool attachment that is selected.

4. The work tool identification system of claim 3, wherein the operator interface is a touch screen.

5. The work tool identification system of claim 1, wherein the data transmission device is further configured to set and send an active flag with the work tool identification data and the interval count; and the electronic machine controller is further configured to generate the work tool identification list for the work tool attachment having the active flag set.

6. The work tool identification system of claim 1, wherein the interval count from the plurality of work tool attachments in common units.

7. The work tool identification system of claim 1, wherein the motion detector includes at least one of an accelerometer, a gyroscope, and a barometer.

8. The work tool identification system of claim 1, wherein the data transmission device has a transmission range of about 100 meters.

9. The work tool identification system of claim 1, wherein the electronic machine controller iteratively generates the work tool identification list based on the interval counts received from a plurality of work tool attachments.

10. A method for work tool identification comprising:
receiving at an electronic machine controller located on a machine a work tool identification data from each of a plurality of work tool attachments;
generating a work tool identification list indicative the work tool identification data from each of the plurality of work tool attachments;
receiving an interval count from each of the plurality of work tool attachments, the interval count indicative of a time interval since initial movement of a work tool attachment from among the plurality of work tool attachments; and
sorting the work tool identification list by the interval counts received from the plurality of work tool attachments with a lowest internal count appearing before any higher interval count;
displaying on an operator interface the work tool identification list;
receiving an operator selection from the work tool identification list, the operator selection indicative of a work tool attachment from among the plurality of work tool attachments;
auto-configuring one or more machine operating parameters based on the operator selection of the work tool attachment;
receiving a coupler attachment status indicative of an opened coupler or a closed coupler on the machine; and
generating the work tool identification list if the coupler attachment status indicates a closed coupler.

11. The method of claim 10, wherein the interval count is measured in common units among the plurality of work tool attachments.

12. The method of claim 11, further comprising detecting an active flag set and sent with the work tool identification data; and displaying in the work tool identification list only the work tool identification data for the plurality of work tool attachments having the active flag set.

13. A work tool identification system comprising:
a machine receiver operatively associated with a machine and configured to receive a work tool identification data and an interval count from each of a plurality of work tool attachments;
an electronic machine controller operatively associated with the machine and configured to (i) generate a work tool identification list indicative of the work tool identification data and (ii) sort the work tool identification list based on the interval count from each of the plurality of work tool attachments with a lowest interval count appearing before any higher interval count;
an operator display for displaying the work tool identification list to an operator, wherein the electronic machine controller is further configured to detect an operator selection from the work tool identification list, the operator selection indicative of a work tool attachment from among the plurality of work tool attachments;
a coupler sensor operatively associated with a machine coupler to send a coupler attachment status indicative of an opened coupler and a closed coupler to the electronic machine controller; and
the electronic machine controller is further configured to generate work tool identification list if the coupler attachment status indicates a closed coupler.

14. The work tool identification system of claim 13, wherein the electronic machine controller is further configured to detect an active flag set and sent with the work tool identification data received by the machine receiver and display in the work tool identification list only the work tool identification data for the plurality of work tool attachments having the active flag set.

* * * * *